United States Patent
Lee et al.

(10) Patent No.: US 8,234,698 B2
(45) Date of Patent: Jul. 31, 2012

(54) ANONYMOUS AUTHENTICATION-BASED PRIVATE INFORMATION MANAGEMENT SYSTEM AND METHOD

(75) Inventors: Yun Kyung Lee, Daejeon (KR); Seung Wan Han, Gwangju (KR); Sok Joon Lee, Daejeon (KR); Byung Ho Chung, Daejeon (KR); Jeong Nyeo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 529 days.

(21) Appl. No.: 12/465,999

(22) Filed: May 14, 2009

(65) Prior Publication Data
US 2010/0146603 A1 Jun. 10, 2010

(30) Foreign Application Priority Data
Dec. 9, 2008 (KR) ........................ 10-2008-0124847

(51) Int. Cl.
*G06F 15/16* (2006.01)
(52) U.S. Cl. ............ 726/6; 726/2; 726/3; 726/4; 726/5; 726/7; 726/8; 726/9; 726/10; 713/175; 713/155; 713/156
(58) Field of Classification Search ................ 726/2–10; 713/168, 173
See application file for complete search history.

(56) References Cited

U.S. PATENT DOCUMENTS

| | | | |
|---|---|---|---|
| 6,463,534 B1 * | 10/2002 | Geiger et al. ................. | 713/168 |
| 6,839,689 B2 | 1/2005 | Aieta et al. | |
| 7,120,929 B2 * | 10/2006 | Beattie et al. .................... | 726/6 |
| 7,533,257 B2 * | 5/2009 | Lee et al. ....................... | 713/155 |
| 7,568,095 B2 * | 7/2009 | Thornton et al. ............. | 713/156 |
| 7,840,813 B2 * | 11/2010 | Canard et al. ................. | 713/176 |
| 2003/0212892 A1 * | 11/2003 | Oishi ............................ | 713/168 |
| 2005/0021954 A1 * | 1/2005 | Kung ............................ | 713/168 |
| 2005/0125319 A1 * | 6/2005 | Johnson ........................ | 705/30 |
| 2005/0138351 A1 * | 6/2005 | Lee et al. ....................... | 713/151 |
| 2007/0118875 A1 * | 5/2007 | Chow et al. ....................... | 726/2 |
| 2008/0028206 A1 * | 1/2008 | Sicard et al. .................. | 713/156 |
| 2010/0131765 A1 * | 5/2010 | Bromley et al. .............. | 713/175 |
| 2010/0223464 A1 * | 9/2010 | Lee et al. ...................... | 713/168 |
| 2011/0055556 A1 * | 3/2011 | Choi et al. .................... | 713/156 |

FOREIGN PATENT DOCUMENTS

| | | |
|---|---|---|
| KR | 1020070105159 | 10/2007 |
| KR | 1020070117758 | 12/2007 |
| KR | 1020080022740 | 3/2008 |
| KR | 1020080080252 | 9/2008 |

\* cited by examiner

*Primary Examiner* — Krisna Lim
(74) *Attorney, Agent, or Firm* — Nelson Mullins Riley & Scarborough LLP; EuiHoon Lee, Esq.

(57) ABSTRACT

An anonymous authentication-based private information management (PIM) system and method are provided. The PIM method includes receiving an anonymous certificate not including user information from an anonymous certification authority; generating an anonymous document including the anonymous certificate and some of the user information; and providing the anonymous document to a web service provider so as to be authenticated and thus provided with a web service by the web service provider. Thus, only a minimum of user information may be provided to the web service provider. In addition, it is possible to strengthen a user's right to self-determination and control over the exposure and use of his or her personal information by allowing a user to manage his or her own personal information or entrusting the PIM server to manage user information. Moreover, it is possible to protect the privacy of a user by preventing the exposure of user information.

9 Claims, 4 Drawing Sheets

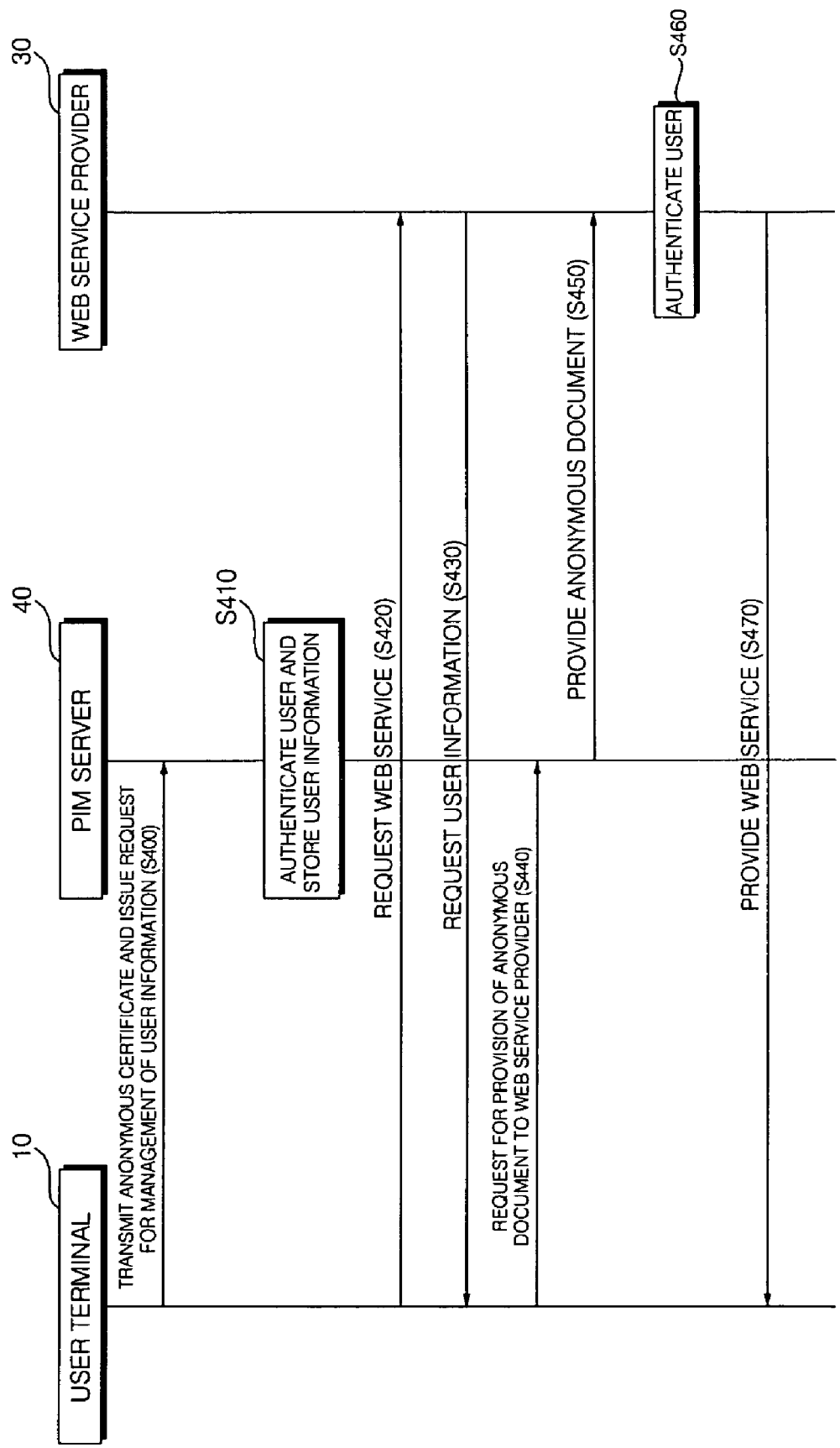

ANONYMOUS AUTHENTICATION-BASED PRIVATE INFORMATION MANAGEMENT SYSTEM AND METHOD

CROSS-REFERENCE TO RELATED APPLICATION

This application claims priority from Korean Patent Application No. 10-2008-0124847 filed on Dec. 9, 2008 in the Korean Intellectual Property Office, the disclosure of which is incorporated herein by reference in its entirety.

BACKGROUND OF THE INVENTION

1. Field of the Invention

The present invention relates to an anonymous authentication-based private information management (PIM) system and method, and more particularly, to an anonymous authentication-based PIM system and method which can safely and efficiently manage user information by strengthening a user's right to self-determination and control over the exposure and use of his or her personal information.

The present invention is based on research (Project Management No.: 2007-S-016-02, Project Title: Development of Low-Cost Large-Scale Global Internet Service Solutions) conducted as part of Information Technology (IT) Growth Power Technology Development Project launched by Ministry of Knowledge Economy and Institute for Information Technology Advancement (IITA).

2. Description of the Related Art

Due to recent developments in web services, many people are now being provided with various web services through the internet. In order to use a web service provided by a website, users may need to provide their user information to the website and thus to subscribe for the website. User information generally includes the name, social security number and identifier (ID) of each user. The exposure of user information may cause serious damage to users.

An increasing number of incidents of hacking have been reported even from major portal websites or electronic-commerce (e-commerce) websites. Customers' personal details may be lost, stolen or exposed not only due to various hacking attempts or but also due to web service providers' failure to properly handle such valuable information. For example, in order to receive information or assistance from a website during the use of a web service provided by the website, users are generally required to have their personal information viewed by the website's customer services personnel without any approval, thereby increasing the probability of user information being exposed.

Once user information is exposed, it is almost impossible to retrieve the user information. Thus, the exposure of user information may cause serious damage to users. In addition, with a heightened awareness of the management of private information, the demand for strengthening users' right to self-determination and control over the exposure and use of their personal information has increased considerably.

SUMMARY OF THE INVENTION

The present invention provides an anonymous authentication-based private information management (PIM) system and method which can safely and efficiently manage user information by strengthening a user's right to self-determination and control over the exposure and use of his or her personal information.

According to an aspect of the present invention, there is provided a PIM method including receiving an anonymous certificate not including user information from an anonymous certification authority; generating an anonymous document including the anonymous certificate and some of the user information; and providing the anonymous document to a web service provider so as to be authenticated and thus provided with a web service by the web service provider.

According to another aspect of the present invention, there is provided a PIM system including an authentication request unit which issues a request for issuance of an anonymous certificate not including user information to an anonymous certification authority; a document generation unit which generates an anonymous document including the anonymous certificate and some of the user information; and a user information management unit which issues a request for a web service to a web service provider by providing the anonymous document to the web service provider.

According to the present invention, it is possible to strengthen a user's right to self-determination and control over the exposure and use of his or her information. In addition, it is possible to strengthen the security of user information by preventing the exposure of such important information as the name and social security number of a user.

BRIEF DESCRIPTION OF THE DRAWINGS

The above and other features and advantages of the present invention will become more apparent by describing in detail preferred embodiments thereof with reference to the attached drawings in which:

FIG. 4 illustrates a message sequence chart showing how the PIM system shown in FIG. 3 manages user information using a PIM server.

DETAILED DESCRIPTION OF THE INVENTION

The present invention will hereinafter be described in detail with reference to the accompanying drawings in which exemplary embodiments of the invention are shown.

Private information management (PIM) systems and methods according to exemplary embodiments of the present invention may prevent the exposure of user information by issuing an anonymous certificate not including the user information and allowing the use of a web service with the anonymous certificate and part of the user information.

Figure 1:
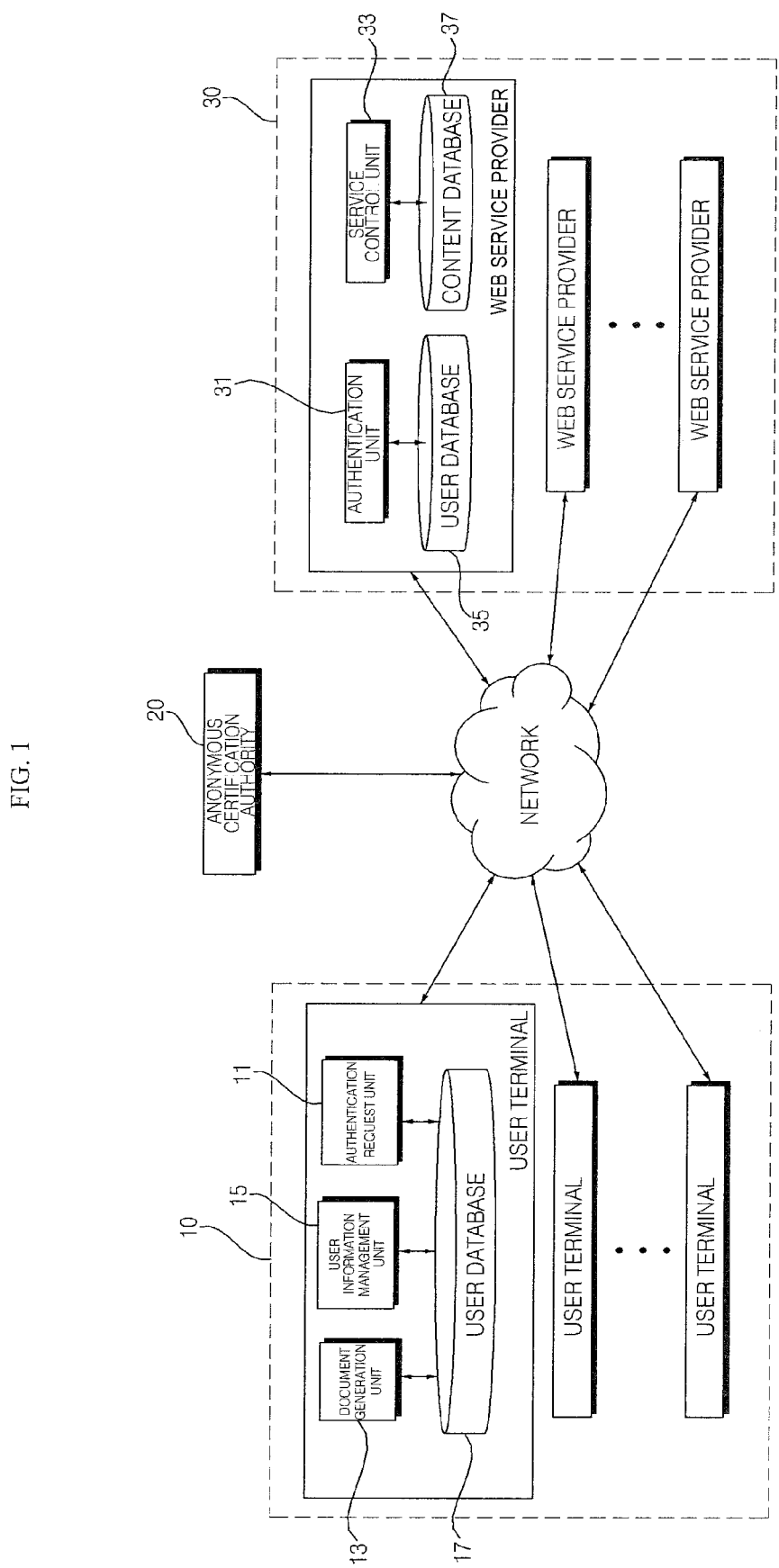
FIG. 1 illustrates a block diagram of a private information management (PIM) system according to an exemplary embodiment of the present invention.

FIG. 1 illustrates a PIM system according to an exemplary embodiment of the present invention. Referring to FIG. 1, the PIM system may include at least one user terminal 10, an anonymous certification authority 20 and at least one web service provider 30.

The anonymous certification authority 20 may issue an anonymous certificate to a user of the user terminal 10 at the request of the user. The anonymous certificate is different from a typical certificate in that user information of the user can be acquired from the anonymous certificate. The user information of the user may include the name, social security number, address, phone number, identifier (ID) and/or password of the user.

In order to receive a certificate from the anonymous certification authority 20, the user may need to be provided with a personal code (such as an ID and a password) through face-to-face authentication by a reliable organization such as a bank or a securities company. The reliable organization may provide the user information of the user and the same personal code as that provided to the user to the anonymous certification authority 20. The anonymous certification authority 20 may generate an anonymous certificate and provide the anonymous certificate to the user by comparing a personal code and user information provided by the user with the personal code and the user information provided by the reliable organization.

An anonymous certificate does not include any user information. Instead, the anonymous certificate may include a minimum of information necessary for the verification of the anonymous certificate such as the ID and expiration date of the anonymous certificate and the name of the anonymous certification authority 20. Therefore, it is impossible to acquire user information from an anonymous certificate.

The user terminal 10 may manage the user information of the user using an anonymous certificate. The user terminal 10 may include a user information database 17, an authentication request unit 11, a document generation unit 13, and a user information management unit 15.

The user information database 17 may store the user information of the user and information regarding the user terminal 10.

The authentication request unit 11 may issue a request for the issuance of an anonymous certificate by transmitting a personal code provided by such an organization as a bank to the anonymous certification authority 20. More specifically, the authentication request unit 11 may transmit the user information present in the user information database 17 and a personal code input by the user to the anonymous certification authority 20. For this, the user information present in the user information database 17 and the personal code input by the user may be encrypted with a key that is only known to the user.

The document generation unit 13 may generate an anonymous document based on the anonymous certificate issued by the anonymous certification authority 20. The anonymous document may include the anonymous certificate issued by the anonymous certification authority 20 and access information necessary for subscribing for and logging on to a website provided by the website service provider 30. If there are a plurality of web service providers 30 requiring different access information, the document generation unit 13 may generate different anonymous documents for the plurality of web service providers 30. The access information included in the anonymous document generated by the document generation unit 13 may include the address, phone number, age and sex of the user. The document generation unit 13 may generate an anonymous document including the address of the user, an anonymous document including the phone number of the user, an anonymous document including the sex of the user, or an anonymous document including at least two of the address, phone number, age and sex of the user.

The document generation unit 13 may generate an anonymous document in advance and may store the anonymous document in the user information database 17. Alternatively, the document generation unit 13 may generate an anonymous document whenever necessary.

If the user chooses to subscribe for or log on to the website of the web service provider 30, the user information management unit 15 may withdraw an anonymous document including access information required by the web service provider 30 from the user information database 17 and may provide the withdrawn anonymous document to the web service provider 30. If an anonymous document including the access information required by the web service provider 30 does not exist in the user information database 17, the user information management unit 15 may control the document generation unit 13 to generate an anonymous document including the access information required by the web service provider 30.

More specifically, if the web service provider 30 requests the name and social security number of the user as access information, the user information management unit 15 may control the document generation unit 13 to generate an anonymous document including the name and social security number of the user. The web service provider 30 may issue a request for the user information of the user to the anonymous certification authority 30 and may thus be provided with the user information of the user by the anonymous certification authority 30. In this case, the web service provider 30 may need to gain approval from the user.

The web service provider 30 may run a website that provides various services to the user. The web service provider 30 may include an authentication unit 31, a content database 37, a user database 35 and a service control unit 33.

The authentication unit 31 may issue a request for submittal of an anonymous document to the user who wishes to subscribe for or log on to the website of the web service provider 30 and may decide whether to provide a service to the user based on an anonymous certificate included in an anonymous document provided by the user. The authentication unit 31 may also issue a request for submittal of access information necessary for subscribing for and/or logging on to the website of the web service provider 30 to the user. In this exemplary embodiment, the authentication unit 31 may require only a minimum of user information, whereas conventional web service providers require almost all user information available. For example, the authentication unit 31 may only require the address, phone number, sex, age and email address of the user.

The authentication unit 31 may determine whether the anonymous certificate included in the anonymous document provided by the user has expired, whether the anonymous certificate included in the anonymous document provided by the user has been issued by a valid anonymous certification authority (i.e., the anonymous certification authority 20), whether the anonymous certificate included in the anonymous document provided by the user has a redundant ID or a valid ID, or whether the anonymous certificate included in the anonymous document provided by the user has been discarded by the anonymous certification authority 20. If the anonymous certificate included in the anonymous document provided by the user is determined to be valid, the authentication unit 31 may transmit a message indicating that the authentication of the anonymous certificate included in the anonymous document provided by the user has been complete to the service control unit 33.

The content database 37 may store various contents that can be provided to the user by the web service provider 30. Examples of the various contents include broadcast programs, moving images, and internet protocol television (IPTV) programs.

The user database 35 may store the ID and the access information of the anonymous certificate included in the anonymous document provided by the user. The user database 35 may also include information generated as a result of the use of the website of the web service provider 30 by the user such as a list of items added to the user's Shopping Cart, the user's purchase history and a list of questions posted in the Q&A section by the user.

The service control unit 33 may withdraw a content desired by the user from the content database 37 and may provide the withdrawn content to the user terminal 10. The service control unit 33 may store the user information of the user and the information generated as a result of the use of the website of the web service provider 30 by the user.

It will hereinafter be described in detail how the PIM system shown in FIG. 1 manages private information with reference to FIG. 2.

Figure 2:
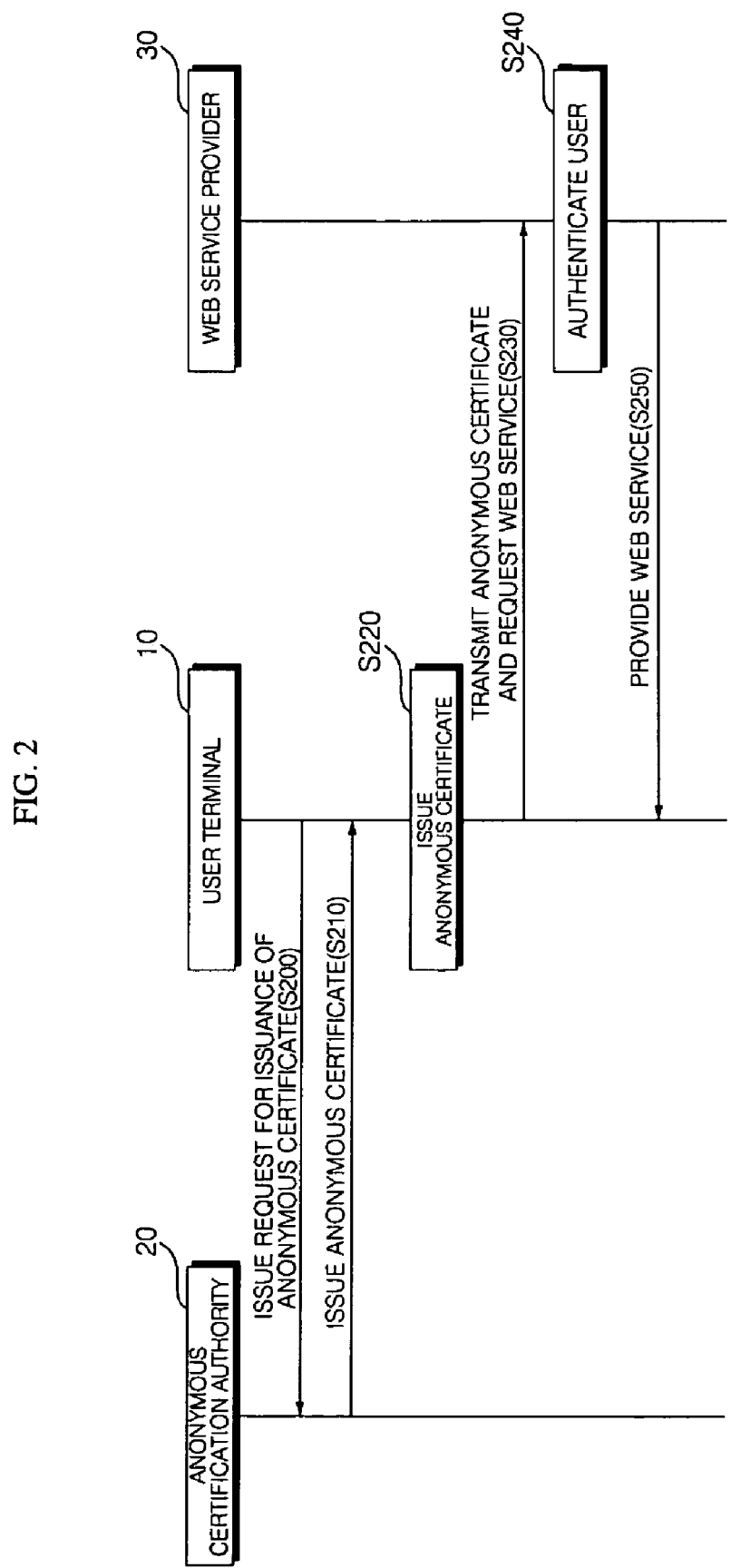
FIG. 2 illustrates a message sequence chart showing how a user is provided with a web service through the PIM system shown in FIG. 1.

Referring to FIGS. 1 and 2, the authentication request unit 11 of the user terminal 10 may transmit the user information and the personal code of the user to the anonymous certification authority 20 and may issue a request for issuance of an anonymous certificate to the anonymous certification authority 20 (S200). The anonymous certification authority 20 may compare the user information and the personal code of the user with user information and a personal code provided by such an organization as a bank and may issue an anonymous certificate to the user terminal 10 based on the results of the comparison (S210).

The document generation unit 13 of the user terminal 10 may generate an anonymous document including the anonymous certificate issued by the anonymous certification authority 20 and access information necessary for accessing the website of the web service provider 30 (S220). Thereafter, the document generation unit 130 may provide the anonymous document to the website of the web service provider 30 and may issue a request for a web service to the web service provider 30 (S230). The authentication unit 31 of the web service provider 30 may authenticate the user using the anonymous certificate included in the anonymous document provided by the user terminal 10 (S240). If the user is successfully authenticated, the access information included in the anonymous document provided by the user terminal 10 may be stored in the user database 35, and the service control unit 33 may withdraw a content desired by the user from the content database 37 and may provide the withdrawn content to the user terminal 10 (S250).

If the user causes damage to the web service provider 30 or to other customers of the web service provider 30 by improperly using the website of the web service provider 30 such as making default in payment for a membership fee, failing to deliver an item for which payment was accepted, or failing to pay for an item that the user commits to purchase, the service control unit 33 may issue a request for inquiry regarding the user or a request for the user information of the user to the anonymous certification authority 20.

Figure 3:
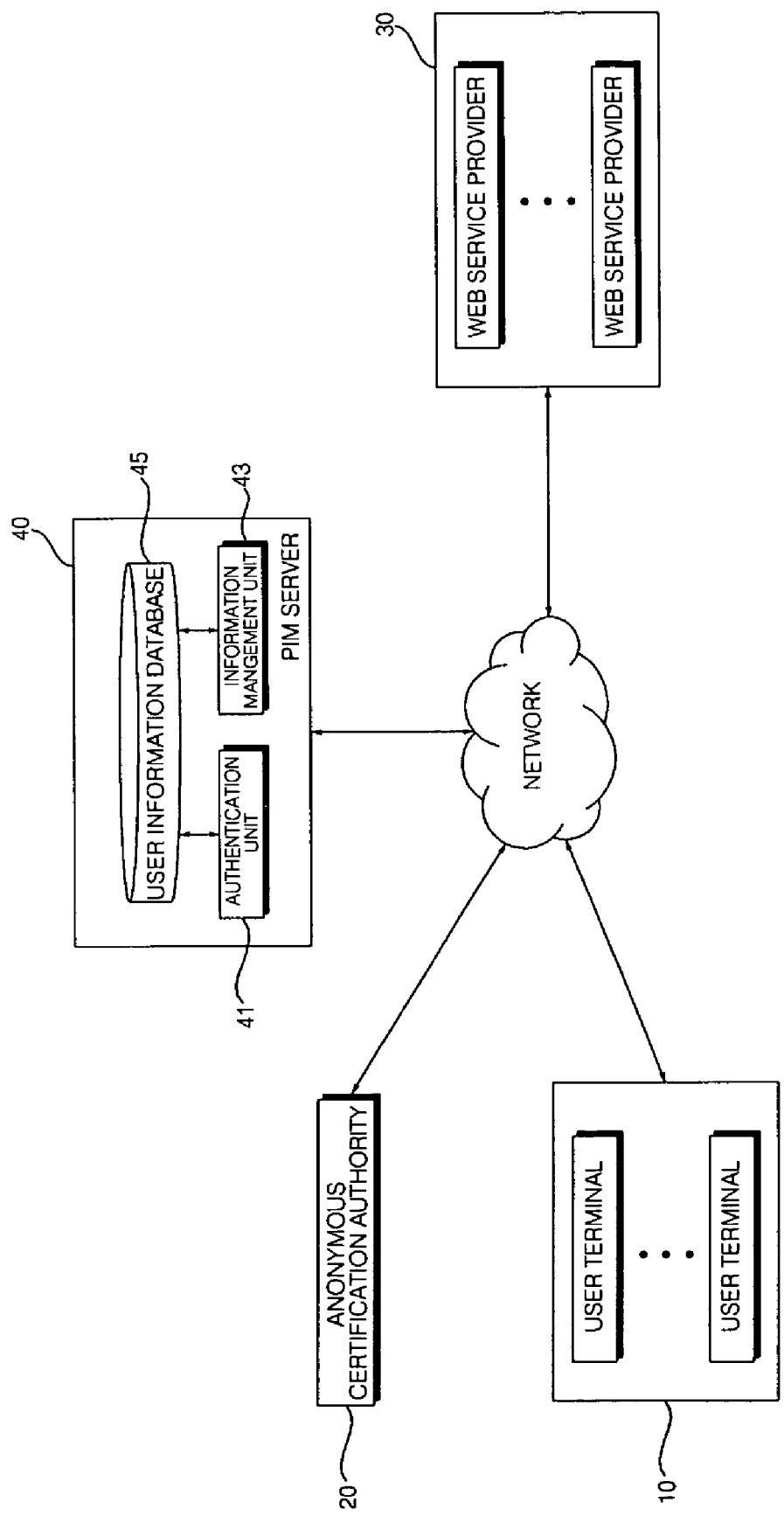
FIG. 3 illustrates a block diagram of a PIM system according to another exemplary embodiment of the present invention.

FIG. 3 illustrates a PIM system according to another exemplary embodiment of the present invention. Referring to FIG. 3, the PIM system may include an anonymous certification authority 20, at least one user terminal 10, a PIM server 40, and at least one web service provider 30. The anonymous certification authority 20, the user terminal 10 and the web service provider 30 are the same as their respective counterparts shown in FIG. 1. Thus, the exemplary embodiment of FIG. 3 will hereinafter be described, focusing mainly on differences with the exemplary embodiment of FIG. 1, and particularly, the PIM server 40.

The PIM server 40 may be a server entrusted to manage user information of a user of the user terminal 10. The user may entrust the PIM server 40 to manage all the user information of the user or only access information necessary for subscribing for and/or logging on to a website of the web service provider 30. In this exemplary embodiment, the user may entrust the PIM server 40 to manage only the access information necessary for subscribing for and/or logging on to the website of the web service provider 30.

The PIM server 40 may include an authentication unit 41, a user information database 45 and an information management unit 43.

The authentication unit 41 may authenticate the user who wishes his or her user information to be managed by the PIM server 40. For this, the authentication unit 41 may be provided with an anonymous certificate and the user information of the user by a user information management unit 15 of the user terminal 10 and may authenticate the user based on the anonymous certificate and the user information of the user.

Once the user is successfully authenticated, the information management unit 43 may store the user information of the user in the user information database 45 as, for example, an anonymous document. The information management unit 43 may not be able to arbitrarily modify, delete or add new information to the user information present in the user information database 45. Instead, the information management unit 43 may be able to modify, delete or add new information to the user information present in the user information database 45 only when a request for modification or deletion of the user information present in the user information database 45 is received or when new information to be added to the user information present in the user information database 45 is provided.

The information management unit 43 may provide an anonymous document to the web service provider 30 upon the request of the user information management unit 15 of the user terminal 10. More specifically, the information management unit 43 may provide an anonymous document including only some user information chosen by the user to the web service provider 30.

If the user information of the user is provided to the web service provider 30, the information management unit 43 may store information regarding the provision of the user information of the user such as the content of the user information of the user provided to the web service provider 30, the name of the web service provider 30 and the date on which the user information of the user is provided to the web service provider 30 in the user information database 45 as a log record.

If there are any updates in the user information of the user, the information management unit 43 may transfer the updated user information collectively to all web service providers 30 that the user has ever joined or used at the user's request.

It will hereinafter be described in detail how the PIM system shown in FIG. 3 manages private information using the PIM server 40 with reference to FIG. 4.

Referring to FIGS. 3 and 4, if an anonymous certificate is issued to the user terminal 10 by the anonymous certification authority 20, the user terminal 10 may transmit the user information of the user and the anonymous certificate to the PIM server 40 and may request the PIM server 40 to manage the user information of the user (S400). The PIM server 40 may authenticate the user based on the anonymous certificate and may store the user information of the user in the user information database 45 as an anonymous document (S410).

If the user terminal 10 issues a request for a web service by subscribing for or logging on to the website of the web service provider 30 (S420), the web service provider 30 may issue a request for user information necessary for the authentication of the user to the user terminal (S430). The user terminal 10 may transmit an anonymous document including the user information requested by the web service provider 30 to the web service provider 30 or may request the PIM server 40 to provide the anonymous document present in the user information database 45 to the web service provider 30 (S440). The PIM server 40 may provide the anonymous document present in the user information database 45 to the web service provider 30 (S450). The web service provider 30 may authenticate the user (S460) and may provide a web service to the user terminal 10 (S470).

According to the present invention, user information may be managed either by a user terminal or by a PIM server. Therefore, it is possible to strengthen a user's right to self-determination and control over the exposure and use of his or her personal information. In addition, according to the present invention, an anonymous certificate and user information may both be provided upon receiving a request for the user information from a web service provider. Therefore, it is possible to strengthen the security of user information by preventing important user information such as the name and the social security number of the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A private information management (PIM) method comprising:
   receiving an anonymous certificate not including user information from an anonymous certification authority;
   generating an anonymous document including the anonymous certificate and some of the user information; and
   providing the anonymous document to a web service provider so as to be authenticated and thus provided with a web service by the web service provider,
   wherein the anonymous certification authority generates the anonymous certificate and provides the anonymous certificate to a user by comparing personal code and user information provided by the user with the personal code and the user information provided by a reliable third party organization.

2. The PIM method of claim 1, wherein the anonymous certificate includes an identifier (ID) and an expiration date of the anonymous certificate and information regarding the anonymous certification authority.

3. The PIM method of claim 1, wherein the providing of the anonymous document comprises determining whether the anonymous certificate has expired.

4. The PIM method of claim 1, further comprising:
   transmitting the anonymous certificate to a PIM server and requesting the PIM server to manage the user information; and
   allowing the PIM server to perform authentication using the anonymous certificate and to store the user information as an anonymous document.

5. The PIM method of claim 4, further comprising allowing the PIM server to provide the anonymous certificate to the web service provider upon the request of the web service provider.

6. A PIM system comprising:
   an authentication request unit which issues a request for issuance of an anonymous certificate not including user information to an anonymous certification authority;
   a document generation unit which generates an anonymous document including the anonymous certificate and some of the user information; and
   a user information management unit which issues a request for a web service to a web service provider by providing the anonymous document to the web service provider,
   wherein the authentication request unit issues the request for the issuance of the anonymous certificate by transmitting personal code provided by a reliable third party organization to the anonymous certification authority.

7. The PIM system of claim 6, wherein the anonymous certificate includes an identifier (ID) and an expiration date of the anonymous certificate and information regarding the anonymous certification authority.

8. The PIM system of claim 6, wherein:
   the user information management unit transmits the anonymous certificate to a PIM server and requests the PIM server to manage the user information; and
   the PIM server manages the user information as an anonymous document.

9. The PIM system of claim 8, wherein the user information management unit requests the PIM server to provide the anonymous certificate to the web service provider upon the request of the web service provider.

* * * * *